US006884074B2

(12) United States Patent
Theilmann

(10) Patent No.: US 6,884,074 B2
(45) Date of Patent: Apr. 26, 2005

(54) DYNAMIC COMPOSITION OF RESTRICTED E-LEARNING COURSES

(75) Inventor: Wolfgang Theilmann, Karlsruhe (DE)

(73) Assignee: SAP Aktiengesellschaft (DE)

( * ) Notice: Subject to any disclaimer, the term of this patent is extended or adjusted under 35 U.S.C. 154(b) by 0 days.

(21) Appl. No.: 10/290,525

(22) Filed: Nov. 8, 2002

(65) Prior Publication Data

US 2003/0152903 A1 Aug. 14, 2003

Related U.S. Application Data

(63) Continuation-in-part of application No. 10/208,204, filed on Jul. 31, 2002, which is a continuation-in-part of application No. 10/134,676, filed on Apr. 30, 2002.
(60) Provisional application No. 60/354,945, filed on Feb. 11, 2002.

(51) Int. Cl.⁷ .............................................. G09B 19/00
(52) U.S. Cl. ......................... 434/118; 434/362; 705/26; 705/30
(58) Field of Search ................................ 434/118, 350, 434/362; 705/1, 26, 30

(56) References Cited

U.S. PATENT DOCUMENTS

| | | |
|---|---|---|
| 5,008,853 A | 4/1991 | Bly et al. |
| 5,310,349 A | 5/1994 | Daniels et al. |
| 5,395,243 A | 3/1995 | Lubin et al. |
| 5,788,508 A | 8/1998 | Lee et al. |

(Continued)

OTHER PUBLICATIONS x.hlp, "Software for Faster Learning,"[online], [retrieved on April. 16, 2003]. Retrieved From the Internet:<URL: http://www.xhlp.com/home.cfm>,7pgs.
Global Knowledge Network, Inc., "On Demand Personal Navigator," [Online], [Retrieved on Sep. 2002]. Retrieved from the Internet: <URL:http://kp.globalknowledge.com/products/od/index.asp>, 2pgs.
U.S. Appl. No. 60/201,500, Adams.
U.S. Appl. No. 60/272,251, Ward.
U.S. Appl. No. 60/329,088, Riggs.
U.S. Appl. No. 60/334,714, Diesel.
U.S. Appl. No. 60/400,606, Diesel.
Hewlett Packard, "HP Open View Integration Guide for Developers," Jul. 2002, [online], [retrieved from the Internet on Mar. 24, 2004: http://h21007.www2.hp.com/dspp/files/unprotected/OpenView/IntegrationGuide/OV_Integration_Guide_7_30.pdf], pp. 67–92, XP002274908.

(Continued)

Primary Examiner—Chanda L. Harris
(74) Attorney, Agent, or Firm—Fish & Richardson P.C.

(57) ABSTRACT

A learning system may be used to dynamically create courses tailored to the needs of a learner. In one implementation, the learning system may dynamically create, assemble, and/or build new temporary courses from the structural elements of an existing course according to the specific needs of a learner. The learner's needs may be expressed using a budget and other criteria provided by the learner. Using the budget and criteria, the learning system may identify existing structural elements that may be used to assemble a dynamic course. After the course is assembled, the course may be temporarily stored and presented to the learner using the learning station.

39 Claims, 13 Drawing Sheets

U.S. PATENT DOCUMENTS

| | | |
|---|---|---|
| 5,881,315 A | 3/1999 | Cohen |
| 6,011,949 A | 1/2000 | Shimomukai |
| 6,014,134 A | 1/2000 | Bell et al. |
| 6,091,930 A | 7/2000 | Mortimer et al. |
| 6,099,320 A | 8/2000 | Papadopoulos |
| 6,112,049 A | 8/2000 | Sonnenfeld |
| 6,148,338 A | 11/2000 | Lachelt et al. |
| 6,149,438 A | 11/2000 | Richard et al. |
| 6,149,441 A | 11/2000 | Pellegrino et al. |
| 6,162,060 A | 12/2000 | Richard et al. |
| 6,164,974 A | 12/2000 | Carlile et al. |
| 6,315,572 B1 | 11/2001 | Owens et al. |
| 6,336,813 B1 | 1/2002 | Siefert |
| 6,347,333 B1 | 2/2002 | Eisendrath et al. |
| 6,347,943 B1 | 2/2002 | Fields et al. |
| 6,368,110 B1 * | 4/2002 | Koenecke et al. .......... 434/219 |
| 6,370,355 B1 * | 4/2002 | Ceretta et al. ............. 434/350 |
| 6,381,444 B1 | 4/2002 | Aggarwal et al. |
| 6,397,036 B1 | 5/2002 | Thean et al. |
| 6,398,556 B1 * | 6/2002 | Ho et al. .................... 434/219 |
| 6,470,171 B1 | 10/2002 | Helmick et al. |
| 6,514,085 B1 | 2/2003 | Slattery et al. |
| 6,527,556 B1 | 3/2003 | Koskinen |
| 6,587,668 B1 | 7/2003 | Miller et al. |
| 6,606,480 B1 | 8/2003 | L'Allier et al. |
| 6,622,003 B1 * | 9/2003 | Denious et al. ............ 434/350 |
| 6,633,742 B1 | 10/2003 | Turner et al. |
| 6,643,493 B1 | 11/2003 | Kilgore |
| RE38,432 E | 2/2004 | Fai et al. |
| 6,709,330 B1 | 3/2004 | Klein et al. |
| 6,729,885 B1 | 5/2004 | Stuppy et al. |
| 2001/0044728 A1 | 11/2001 | Freeman et al. |
| 2001/0047310 A1 * | 11/2001 | Russell ........................ 705/26 |
| 2002/0006603 A1 | 1/2002 | Peterson et al. |
| 2002/0042041 A1 | 4/2002 | Owens et al. |
| 2002/0061506 A1 | 5/2002 | Catten et al. |
| 2002/0073063 A1 | 6/2002 | Faraj |
| 2002/0138841 A1 | 9/2002 | Ward |
| 2002/0142278 A1 | 10/2002 | Whitehurst et al. |
| 2002/0174021 A1 * | 11/2002 | Chu et al. ..................... 705/26 |
| 2002/0188583 A1 | 12/2002 | Rukavina et al. |
| 2003/0013073 A1 | 1/2003 | Duncan et al. |
| 2003/0049593 A1 | 3/2003 | Parmer et al. |
| 2003/0073063 A1 | 4/2003 | Dattaray et al. |
| 2003/0073065 A1 | 4/2003 | Riggs |
| 2003/0082508 A1 * | 5/2003 | Barney ....................... 434/308 |
| 2003/0113700 A1 | 6/2003 | Simon |
| 2003/0129576 A1 | 7/2003 | Wood et al. |
| 2003/0151629 A1 * | 8/2003 | Krebs et al. ................ 345/810 |
| 2003/0152899 A1 * | 8/2003 | Krebs et al. ................ 434/350 |
| 2003/0152900 A1 * | 8/2003 | Krebs et al. ................ 434/350 |
| 2003/0152901 A1 * | 8/2003 | Altenhofen et al. ........ 434/350 |
| 2003/0152902 A1 * | 8/2003 | Altenhofen et al. ........ 434/350 |
| 2003/0152904 A1 | 8/2003 | Doty, Jr. |
| 2003/0152905 A1 * | 8/2003 | Altenhofen et al. ........ 434/362 |
| 2003/0152906 A1 * | 8/2003 | Krebs et al. ................ 434/362 |
| 2003/0157470 A1 * | 8/2003 | Altenhofen et al. ........ 434/350 |
| 2003/0163784 A1 | 8/2003 | Daniel et al. |
| 2003/0175664 A1 | 9/2003 | Frangenheim et al. |
| 2003/0175676 A1 * | 9/2003 | Theilmann et al. ......... 434/350 |
| 2003/0211447 A1 | 11/2003 | Diesel et al. |
| 2003/0224339 A1 | 12/2003 | Jain et al. |
| 2004/0081951 A1 | 4/2004 | Vigue et al. |

OTHER PUBLICATIONS

Hewlett Packard, "hp Open View Service Navigator for hp Open View Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:wwws.sun-.com/software/sunone/wp–spine/spine.pdf], pp. 1–32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Jörg Siekmann et al., "Adaptive Course Generation and Presentation," ITS Workshop on Adaptive and Intelligent Web–Based Foundation System, Montreal, The Omega Group; pp. 1–10, 2000.

Lai Jin et al., "An Ontology—Aware Authoring Tool—Functional structure and guidance generation," Proceedings of AIED '99, pp. 85–92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1–4, 1999.

Michael Jungmann et al., "Adaptive Hypertext in Complex Information Spaces," Daimler–Benz Research & Technology, Technical University of Ilmenau, pp. 1–5, Mar. 8, 1997.

Nicola Henze et al.,"Modeling Constructivist Teaching Functionality and Structure in the KBS Hyperbook System," University of Hannover, pp. 1–12, Jun. 4, 1999.

Max Mühlhäuser, "Cooperative Computer–Aided Authoring and Learning," University of Karlsruhe, pp. 107–130, 145–161, 165–192, 273–291, 293–318, 1995.

Professor Jouko Paaso, "A New Environment for Courseware Development, Course Delivery and Training," Proceedings of the ED–Media 97, Toronto, 1997.

* cited by examiner

US 6,884,074 B2

DYNAMIC COMPOSITION OF RESTRICTED E-LEARNING COURSES

This application is a continuation-in-part of U.S. application Ser. No. 10/208,204, filed Jul. 31, 2002, and titled OFFLINE E-LEARNING which is a continuation-in-part of U.S. application Ser. No. 10/134,676, filed Apr. 30, 2002, and titled E-LEARNING SYSTEM, which claims benefit of U.S. Provisional Application No. 60/354,945, filed Feb. 11, 2002, and titled FLEXIBLE INSTRUCTIONAL ARCHITECTURE FOR E-LEARNING, all of which are hereby incorporated by reference in their entirety for all purposes.

TECHNICAL FIELD

The following description relates generally to e-learning and in particular to dynamic composition of an e-learning course.

BACKGROUND

Systems and applications for delivering computer-based training (CBT) have existed for many years. However, CBT systems historically have not gained wide acceptance. A problem hindering the reception of CBTs as a means of training workers and learners is the inflexibility of courses and training material.

Early CBTs also were based on hypermedia systems that statically linked content. User guidance was given by annotating the hyperlinks with descriptive information. The trainee could proceed through learning material by traversing the links embedded in the material. The structure associated with the material was very rigid, and the material could not be easily written, edited, or reused to create additional or new learning material.

Newer methods for intelligent tutoring and CBT systems are based on special domain models that must be defined prior to creation of the course or content. Once a course is created, the course material may not be easily adapted or changed for specific training needs of different learners. As a result, the course often fails to meet the needs of the trainee and/or trainer.

Furthermore, it is not always convenient for a learner to take an entire course. However, because the course is inflexible, the learner must pay for the entire course even if the learner desires to take only a portion of the course. Therefore, for the above and other reasons, new methods and technologies are needed to supplement traditional computer based training and instruction.

SUMMARY

Conventional CBT systems offer fixed courses to a learner. For example, the learner has the option of taking the entire course or not taking course. However, a learner may not want to take the entire course for various reasons. Therefore, a learning system or methods may be used to dynamically create courses tailored to the needs of a learner.

In one general aspect, the learning system may dynamically create, assemble, and/or build new temporary courses from the structural elements of an existing course according to the specific needs of a learner. The learner's needs may be expressed using a budget and other criteria provided by the learner. Using the budget and criteria, the learning system may identify existing structural elements that may be used to assemble a dynamic course. After the course is assembled, the course may be temporarily stored and presented to the learner.

Other features and advantages will be apparent from the description, the drawings, and the claims.

DESCRIPTION OF DRAWINGS

Like reference symbols in the various drawings indicate like elements.

DETAILED DESCRIPTION

E-Learning Content Structure

According to the implementations described below, an e-learning system and methodology structures content associated with a course or training so that the content is reusable and flexible. For example, the content structure allows the creator of a course to reuse existing content to create new or additional courses. In addition, the content structure provides flexible content delivery that may be adapted to the needs of different learners. In particular, course content may be dynamically assembled into a temporary course as explained in detail below.

A course may be created from a number of learning objects associated with content that forms the course material. Each learning object may include information/data associated with the course and/or links to the data. The learning objects also may have associated metadata that may be used to describe attributes, characteristics, and/or qualities of the learning objects, in addition to relations to other learning objects. The learning objects may be organized and/or assembled to create a course (which may be presented to a learner).

Figure 1:
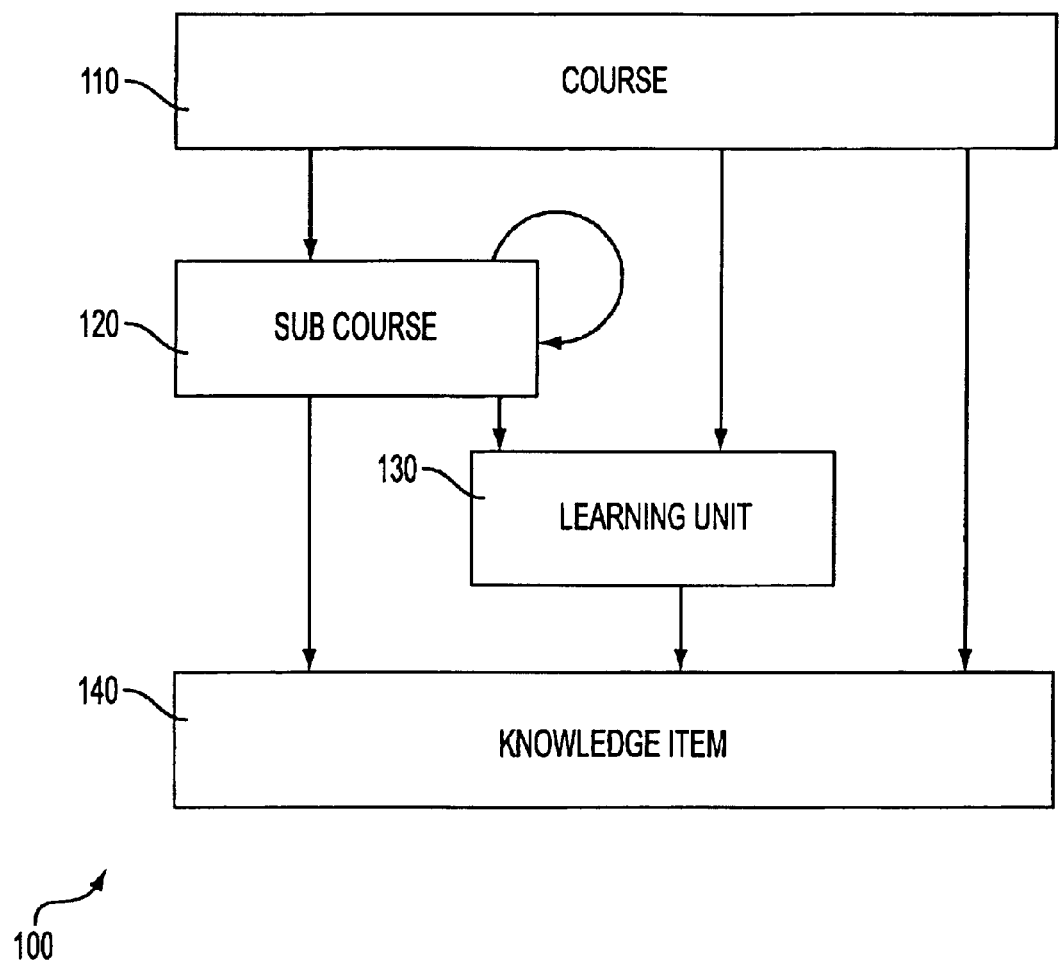
FIG. 1 is an exemplary course content aggregation model.

In one implementation, the e-learning objects may be implemented using one or more structural elements. Content associated with the course may be amassed using the structural elements arranged at different aggregation levels. Each higher level structural element may refer to any instances of all structural elements of a lower level. At its lowest level, a structural element refers to content and may not be further divided. According to one implementation shown in FIG. 1, course material 100 may be divided into four structural elements: a course 110, a sub-course 120, a learning unit 130, and a knowledge item 140.

Starting from the lowest level, knowledge items 140 are the basis for the other structural elements and are the building blocks of the course content structure. Each knowledge item 140 may include content that illustrates, explains, practices, or tests an aspect of a thematic area or topic. Knowledge items 140 typically are small in size (e.g., of limited duration).

A number of attributes may be used to describe a knowledge item 140, such as, for example, a name, a type of media, access rights, device capabilities, and a type of knowledge. The name may be used by a learning system to identify and locate the content associated with a knowledge item 140. The type of media describes the form of the content that is associated with the knowledge item 140. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test. An access right may be used to determine whether to give access to a learner or other individual (e.g., a course author, an instructor, and/or a tutor).

A knowledge item 140 also may be, described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types is described in further detail below.

Knowledge items 140 may be generated using a wide range of technologies, however, a browser (including plug-in applications) should be able to interpret and display the appropriate file formats associated with each knowledge item. For example, markup languages (such as a Hypertext Markup language (HTML), a standard generalized markup language (SGML), a dynamic HTML (DHTML®), or an extensible markup language (XML)), JAVASCRIPT® (a client-side scripting language), and/or FLASH® may be used to create knowledge items 140 and their associated data.

HTML may be used to describe the logical elements and presentation of a document, such as, for example, text, headings, paragraphs, lists, tables, or image references.

FLASH® may be used as a file format for FLASH® movies and as a plug-in for playing FLASH® files in a browser. For example, FLASH® movies using vector and bitmap graphics, animations, transparencies, transitions, MP3 audio files, input forms, and interactions may be used. In addition, FLASH® allows a pixel-precise positioning of graphical elements to generate impressive and interactive applications for presentation of course material to a learner.

Learning units 130 may be assembled using one or more knowledge items 140 to represent, for example, a distinct, thematically-coherent unit. Consequently, learning units 130 may be considered containers for knowledge items 140 of the same topic. A learning unit 130 also may be considered relatively small in size (e.g., of limited duration) though larger than a knowledge item 140.

Sub-courses 120 may be assembled using other sub-courses 120, learning units 130, and/or knowledge items 140. The sub-course 120 may be used to split up an extensive course into several smaller subordinate courses. Sub-courses 120 also may be used to build an arbitrarily deep nested structure by referring to other sub-courses 120.

Courses may be assembled from all of the subordinate structural elements including sub-courses 120, learning units 130, and knowledge items 140. To foster maximum reuse and flexibility, all structural elements should be self-contained and context free.

Structural elements also may be tagged with metadata that is used to support adaptive delivery, reusability, and search/retrieval of content associated with the structural elements. For example, learning object metadata (LOM) defined by the IEEE "Learning Object Metadata Working Group" may be attached to individual course structure elements. The metadata also may be used to indicate learner competencies associated with the structural elements. Other metadata may include a number of knowledge types (e.g., orientation, action, explanation, and resources) that may be used to categorize structural elements.

Figure 2:
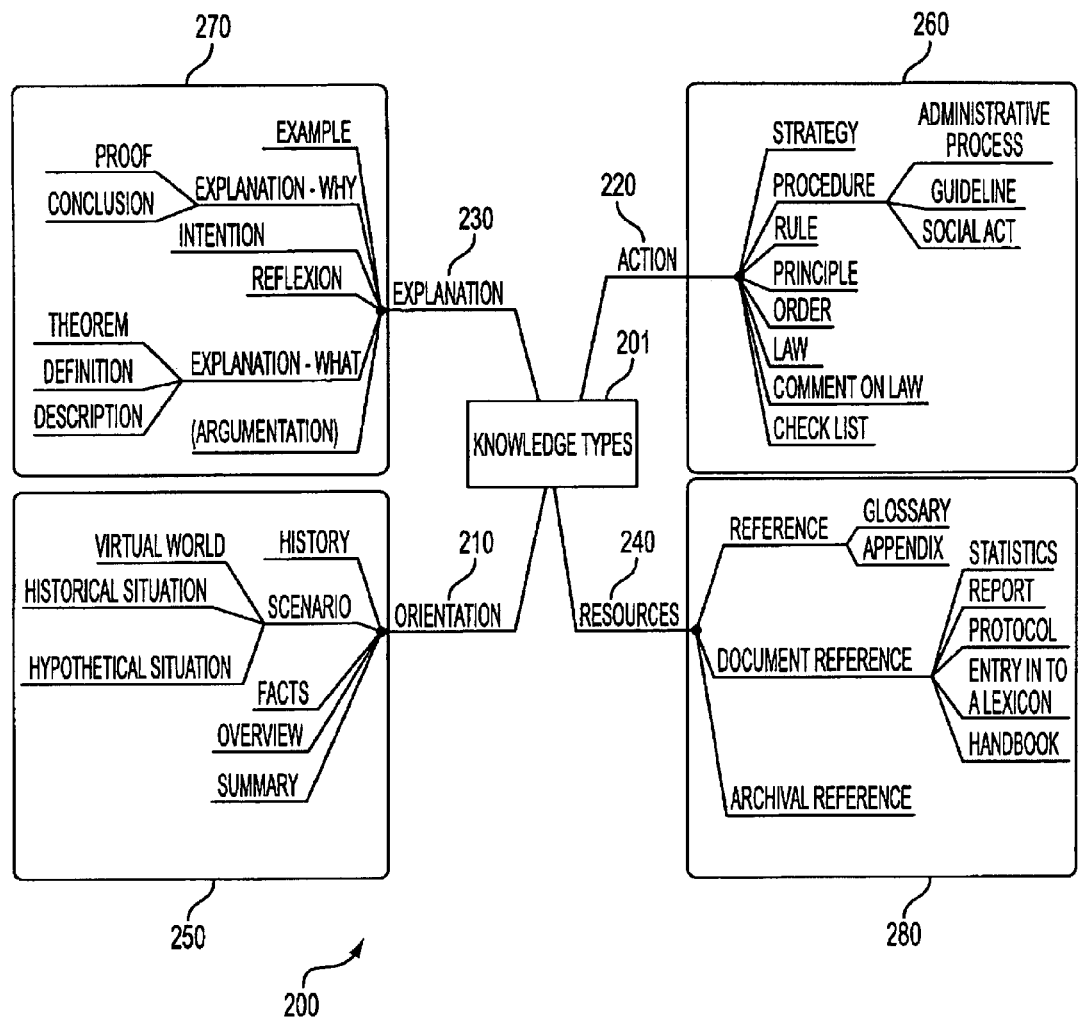
FIG. 2 is an example of an ontology of knowledge types.

As shown in FIG. 2, structural elements may be categorized using a didactical ontology 200 of knowledge types 201 that include orientation knowledge 210, action knowledge 220, explanation knowledge 230, and reference knowledge 240. Orientation knowledge 210 helps a learner to find their way through a topic without being able to act in a topic-specific manner and may be referred to as "know what." Action knowledge 220 helps a learner to acquire topic related skills and may be referred to as "know how." Explanation knowledge 230 provides a learner with an explanation of why something is the way it is and may be referred to as "know why." Reference knowledge 240 teaches a learner where to find additional information on a specific topic and may be referred to as "know where."

The four knowledge types (orientation, action, explanation, and reference) may be further divided into a fine grained ontology as shown in FIG. 2. For example, orientation knowledge 210 may refer to sub-types 250 that include a history, a scenario, a fact, an overview, and a summary. Action knowledge 220 may refer to sub-types 260 that include a strategy, a procedure, a rule, a principle, an order, a law, a comment on law, and a checklist. Explanation knowledge 230 may refer to sub-types 270 that include an example, a intention, a reflection, an explanation of why or what, and an argumentation. Resource knowledge 240 may refer to sub-types 280 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed.

Relations may be divided into two categories: subject-taxonomic and non-subject taxonomic. Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B," describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to,"

"precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B)). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 140 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 120 or a learning unit 130. The competencies may be used to indicate and evaluate the performance of a learner as the learner traverse the course material. A competency may be classified as a cognitive skill, an emotional skill, an senso-motorical skill, or a social skill.

Course Graphs

The content structure associated with a course may be represented as a set of graphs. A structural element may be represented as a node in a graph. Node attributes are used to convey the metadata attached to the corresponding structural element (e.g., a name, a knowledge type, a competency, one or more cost elements, access rights, device type, and/or a media type). A relation between two structural elements may be represented as an edge.

Figure 3:
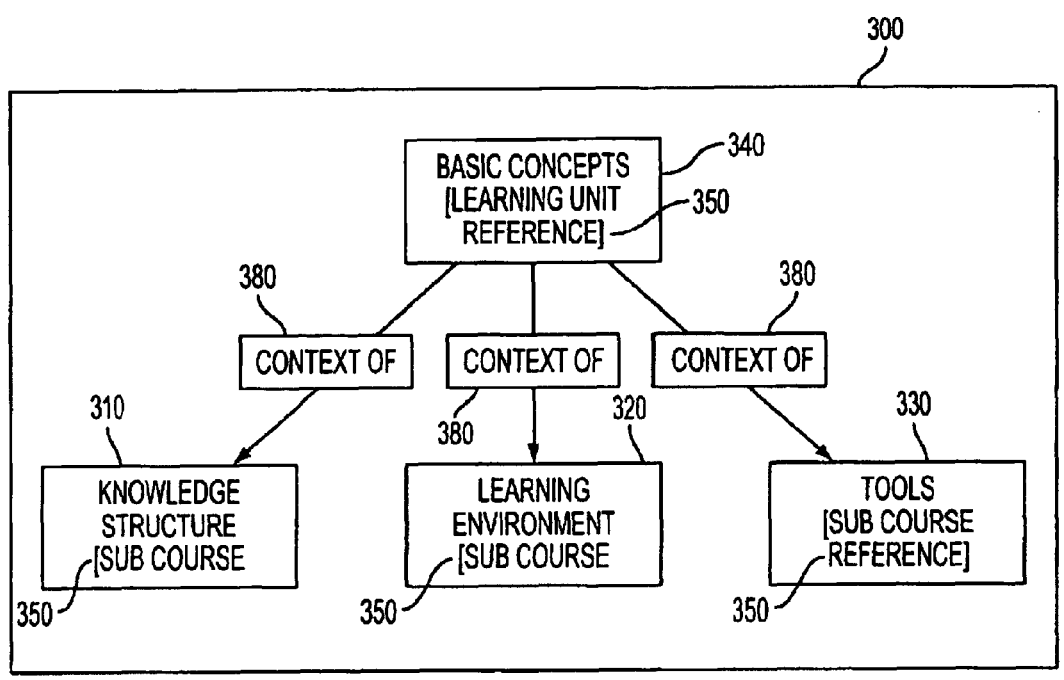
FIG. 3 is an example of a course graph for e-learning.

For example, FIG. 3 shows a graph 300 for a course. The course is divided into four structural elements or nodes (310, 320, 330, and 340): three sub-courses (e.g., knowledge structure, learning environment, and tools) and one learning unit (e.g., basic concepts). A node attribute 350 of each node is shown in brackets (e.g., the node labeled "Basic concepts" has an attribute that identifies it as a reference to a learning unit). In addition, an edge 380 expressing the relation "context of" has been specified for the learning unit with respect to each of the sub-courses. As a result, the basic concepts explained in the learning unit provide the context for the concepts covered in the three sub-courses.

Figure 4:
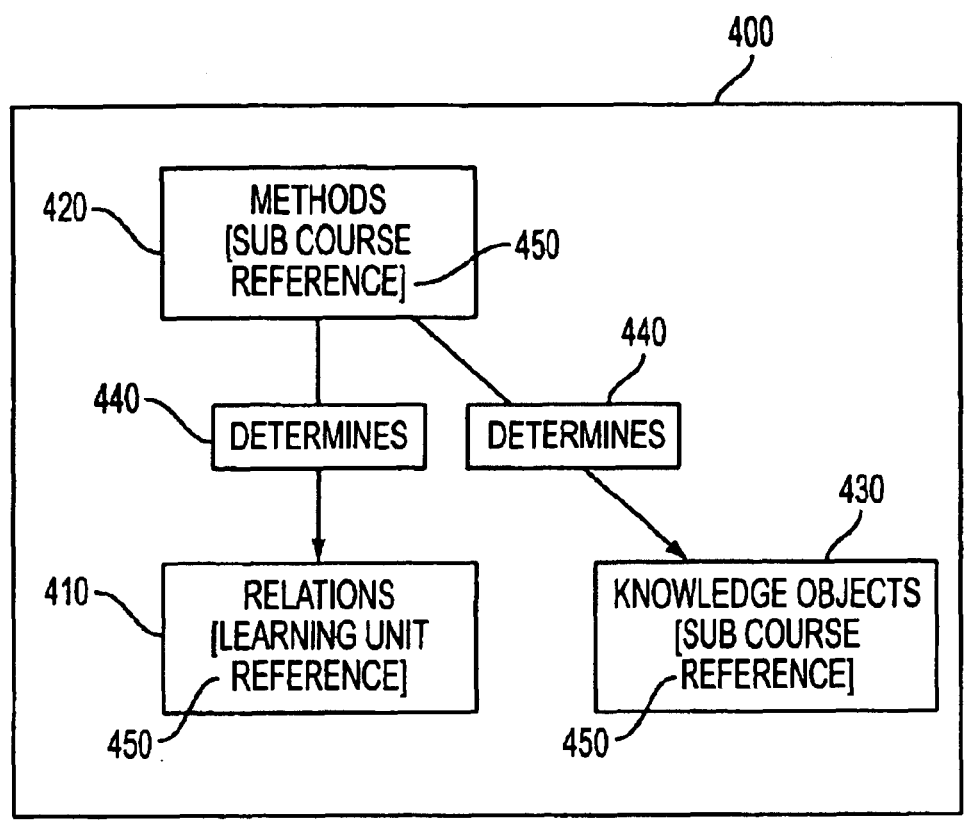
FIG. 4 is an example of a sub-course graph for e-learning.

FIG. 4 shows a graph 400 of the sub-course "Knowledge structure" 350 of FIG. 3. In this example, the sub-course "Knowledge structure" is further divided into three nodes (410, 420, and 430): a learning unit (e.g., on relations) and two sub-courses (e.g., covering the topics of methods and knowledge objects). The edge 440 expressing the relation "determines" has been provided between the structural elements (e.g., the sub-course "Methods" determines the sub-course "Knowledge objects" and the learning unit "Relations".) In addition, the attribute 450 of each node is shown in brackets (e.g., nodes "Methods" and "Knowledge objects" have the attribute identifying them as references to other sub-courses; node "Relations" has the attribute of being a reference to a learning unit).

Figure 5:
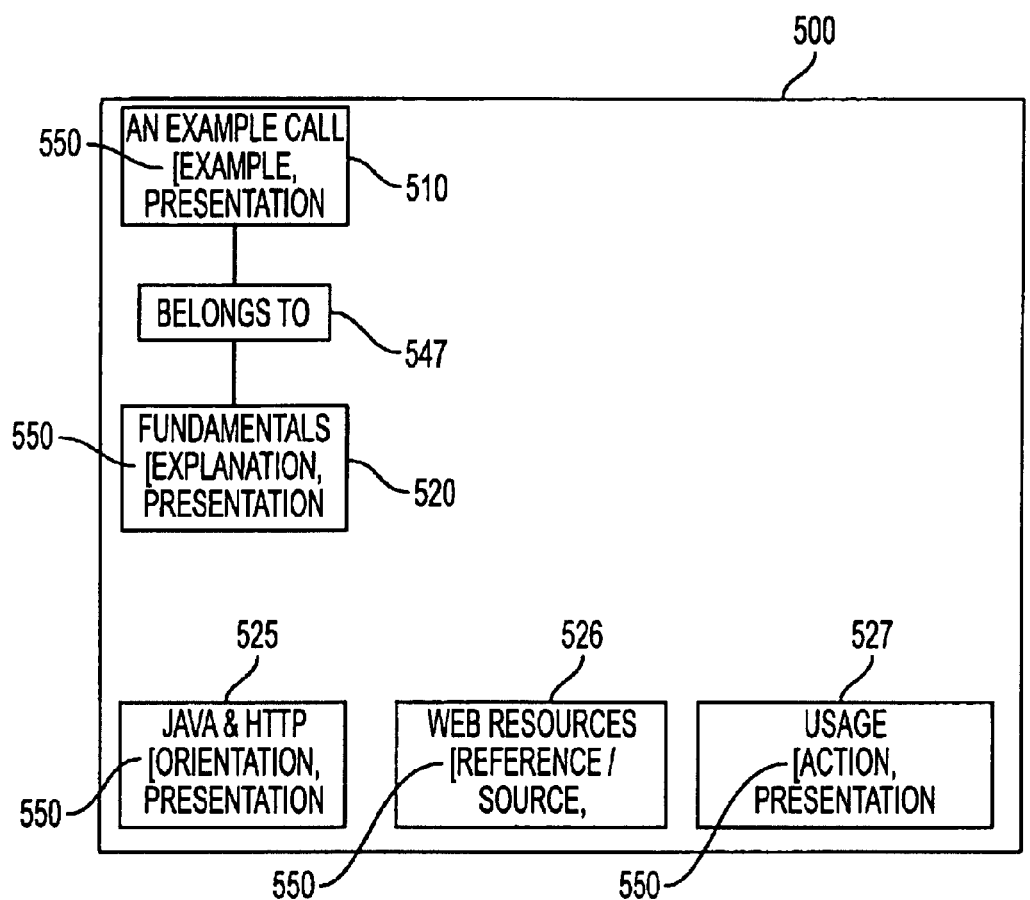
FIG. 5 is an example of a learning unit graph for e-learning.

FIG. 5 shows a graph 500 for a learning unit "Http in JAVA®." The learning unit includes five nodes (510, 520, 525, 526, 527, and 528): five knowledge items (i.e., "An example call)", "Fundamentals", "JAVA® and Http", "Web resources", and "Usage"). An edge 547 expressing the relation "belongs to" has been provided between the knowledge items "An example call" and "Fundamentals)." In addition, attributes 550 of each node are specified in brackets (e.g., the node "An example call" includes the attributes "Example" and "Presentation").

E-Learning Strategies

The above-described content aggregation and structure associated with a course does not automatically enforce any sequence that a learner may use to traverse the content associated with the course. As a result, different sequencing rules may be applied to the same course structure to provide different paths through the course. The sequencing rules applied to the knowledge structure of a course are learning strategies. The learning strategies may be used to pick specific structural elements to be suggested to the learner as the learner progresses through the course. The learner or supervisor (e.g., a tutor) may select from a number of different learning strategies while taking a course. In turn, the selected learning strategy considers both the requirements of the course structure and the preferences of the learner. As a result, the progression of learners through the course may differ.

Learning strategies may be created using macro-strategies and micro-strategies. A learner may select from a number of different learning strategies when taking a course. The learning strategies are selected at run time of the presentation of course content to the learner (and not during the design of the knowledge structure of the course).

Macro-strategies are used in learning strategies to refer to the coarse-grained structure of a course (i.e., the organization of sub-courses 120 and learning units 130). The macro-strategy determines the sequence that sub-courses 120 and learning units 130 of a course are presented to the learner. Basic macro-strategies include "inductive" and "deductive," which allow the learner to work through the course from the general to the specific or the specific to the general, respectively. Other examples of macro-strategies include "goal-based, top-down," "goal-based, bottom-up," and "table of contents."

Micro-strategies, implemented by the learning strategies, target the learning progression within a learning unit. The micro-strategies determine the order that knowledge items of a learning unit are presented. Micro-strategies refer to the attributes describing the knowledge items. Examples of micro-strategies include "orientation only", "action oriented", "explanation-oriented", and "table of contents").

E-Learning System

Figure 6:
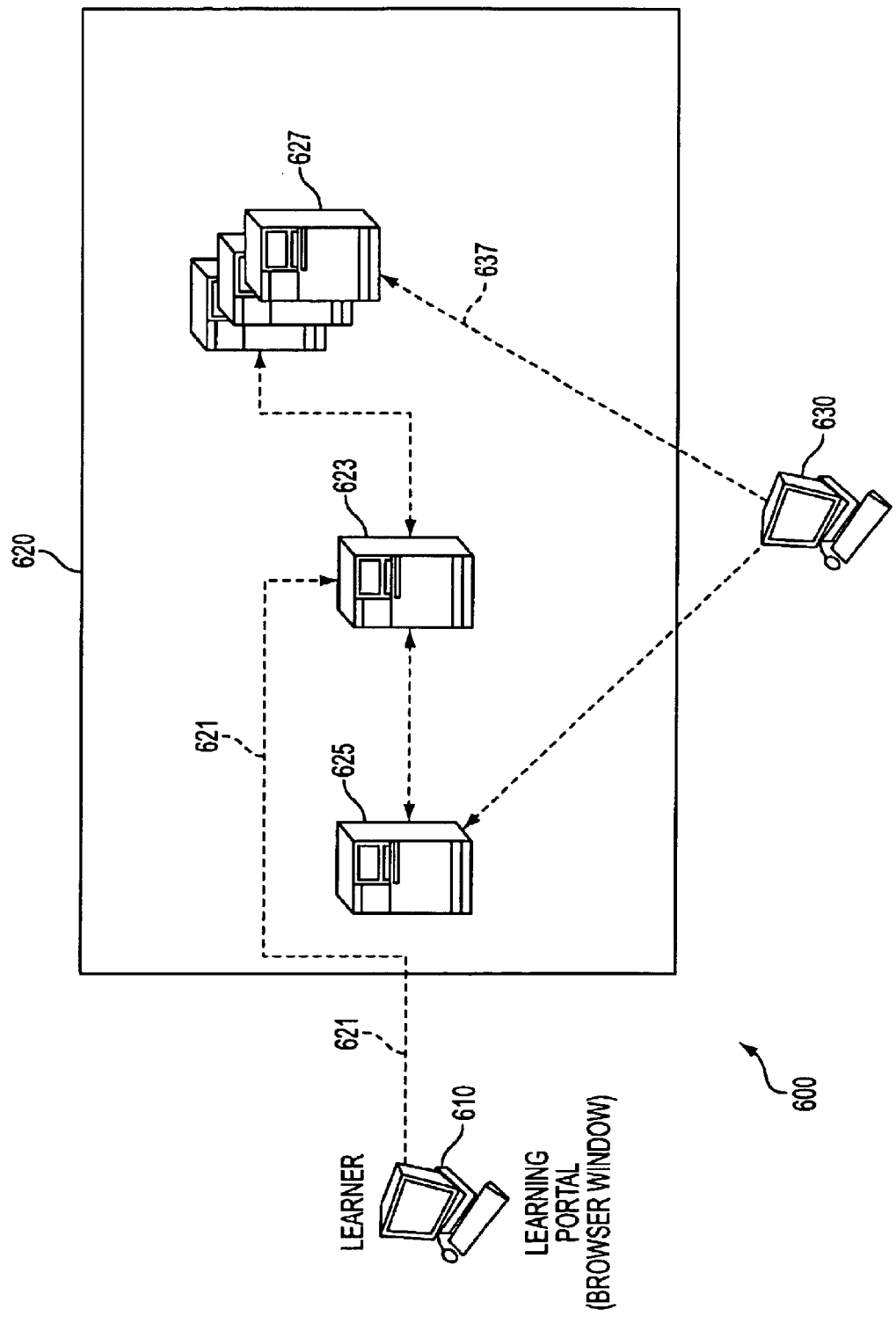
FIGS. 6 and 7 are exemplary block diagrams of e-learning systems.

As shown in FIG. 6, an e-learning architecture 600 may include a learning station 610 and a learning system 620. The learner may access course material using a learning station 610. The learning station 610 may be implemented using any general purpose computer that is capable of executing instructions in a defined manner including: a special purpose computer, a personal computer, a work station, a programmable logic device or a portable computing device. The learning station 610 may execute any number of software applications, including an application that is configured to access, interpret, and present courses and related information to a learner.

The learning station 610 may include a browser to implement a learning portal that allows a learner to access the learning system 620. A link 621 between the learning portal and the learning system 620 may be configured to send and receive signals (e.g., electrical, electromagnetic, or optical) that convey or carry data streams representing various types of analog and/or digital content. For example, the communications link 621 may be implemented using a plain old telephone service (POTS) line network, a digital user line (DSL) network, an integrated services digital network (ISDN), and a synchronous optical network (SONET), or combinations of one or more of these networks. In addition, the communications links may include a wireless link using electromagnetic signals, such as, for example, radio, infrared, and microwave signals, to convey information. The communications link 621 also may include one or more networks or network devices (e.g., servers, routers, switches, hubs, repeaters, and storage devices).

The learning system 620 may include one or more servers. As shown in FIG. 6, the learning system 620 includes a learning management system 623, a content management system 625, and an administration management system 627. Each of these systems may be implemented using one or more servers, processors, or intelligent network devices. In addition, an authoring station 630 may be provided to create courses from structural elements.

Figure 7:
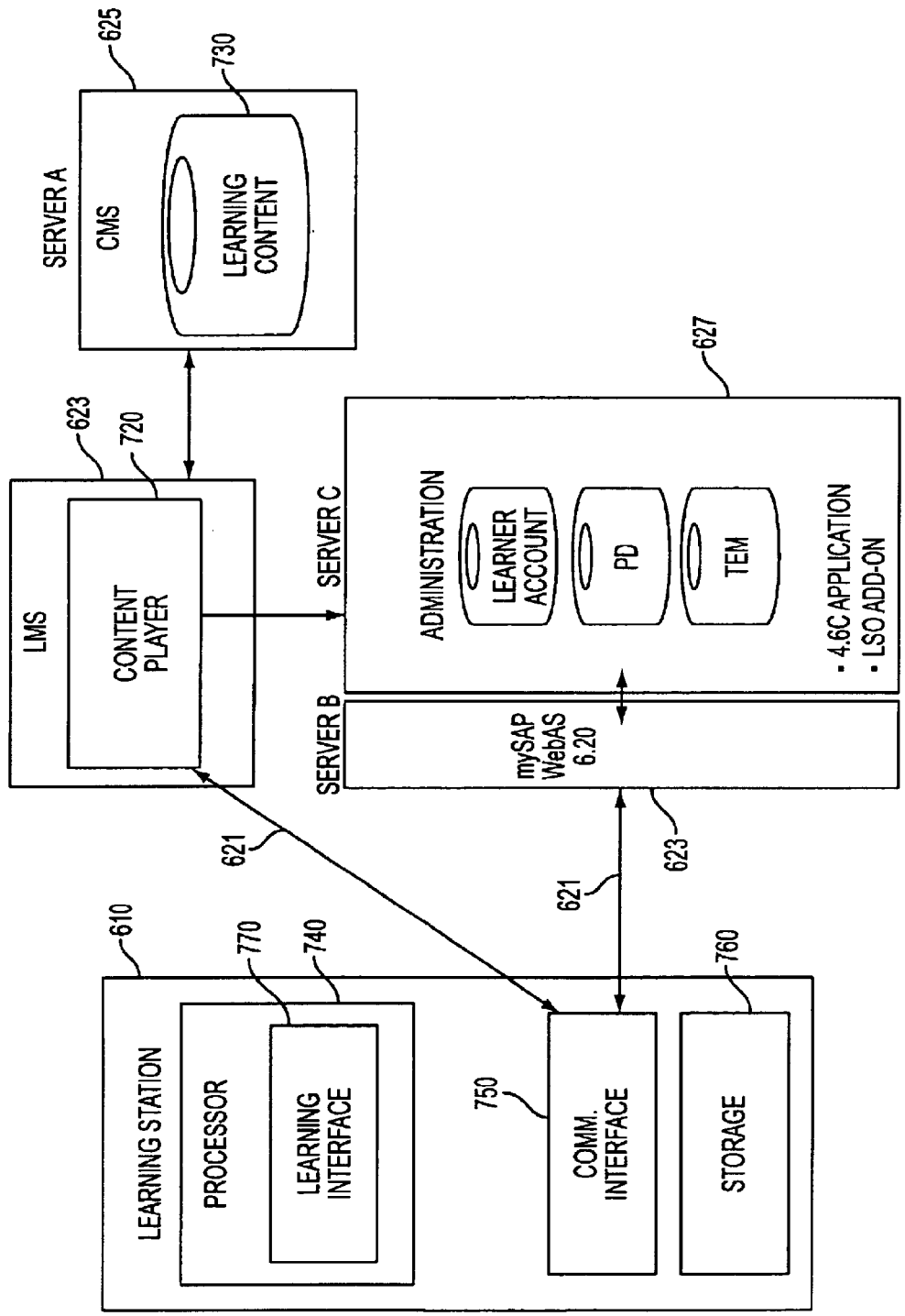

As shown in FIG. 7, the administration management system 627 may be implemented using a server, such as, for example, the SAP R/3 4.6C+LSO Add-On. The administration management system 627 includes a database of learner accounts and course information. For example, the learner account may include demographic data about the learner (e.g., a name, an age, a sex, an address, a company, a school, an account number, and a bill) and his/her progress through the course material (e.g., places visited, tests completed, skills gained, knowledge acquired, and competency using the material). The administration management system 627 also may provide additional information about courses, such as course title, description, courses offered, a course catalog the author/instructor of a course, and the most popular courses.

The content management system 625 may include a learning content server 730. The learning content server 730 may be implemented using a WebDAV server. The learning content server may include a content repository. The content repository stores course files and media files that are used to present a course to a learner at the learning station 610. The course files may include the structural elements that make up a course and may be stored as XML files. The media files may be used to store the content that is included in the course and assembled for presentation to the learner at the learning station 610.

The learning management system 623 may include a content player 720. The content player 720 may be implemented using a server, such as an SAP J2EE Engine. The content player 720 is used to obtain course material from the content repository. The content player 720 also applies the learning strategies to the obtained course material to generate a navigation tree or path for the learner. The navigation tree or path is used to suggest a route through the course material for the learner and to generate a presentation of course material to the learner based on the learning strategy selected by the learner.

The learning management system 623 also may include an interface for exchanging information with the administration management system 627. For example, the content player 720 may update the learner account information as the learner progresses through the course material to indicate, for example, competencies gained, tests passed, courses completed.

Learning Station

The learner may access information about a course, content associated with a course, information about the learning system 620, and information about the learner (e.g., the learner account) using the learning station 610. As shown in FIG. 7, the learning station 610 may include a processor 740, a communications interface 750, and a storage device 760. The learning station 610 also may include any number of peripherals or integrated devices (not shown) (e.g., displays, memory/storage devices, input devices, ports/interfaces, printers, communication interfaces, and speakers) that facilitate access to, presentation of, and interaction with the course, its content, and associated course information.

The processor 740 may be used to implement a learning interface 770. For example, the processor 740 may execute any number of software applications including a learning interface that is configured to access, interpret, and present a course and associated information to a learner, and to allow a learner to interact with the content and the learning system 620.

The learning station 610 may be provided with a number of software applications. The software may include a browser, such as, for example, NETSCAPE COMMUNICATOR®, MICROSOFT INTERNET EXPLORER® or any other software application that may be used to interpret and process a markup language, such as HTML, SGML, DHTML®, XML, or XHTML. The browser also may include software plug-in applications that allow the browser to interpret, process, and present different types of information. The browser may include any number of application tools, such as, for example, JAVA®, ACTIVE X®, JAVASCRIPT®, and FLASH®.

The communications interface 750 may facilitate the exchange of data and information between the learning station 610 and the learning system 620. For example, the communications interface may be a communications card, a modem, a port, a transceiver or a device that is able to transmit and receive data using the communications link 621. Data may be received from the learning system 620 and processed by the processor 740 and/or stored in the storage 760. Similarly, data processed by the processor 740 and/or stored in the storage 760 may be transmitted to the learning system 620.

As described above, the learner may contact the learning system 620 using the learning station 610 to access a course. The learning interface 770 and associated browser may be used to implement a graphical user interface that accepts information input from the learner and presents information received from the learning system 620. The learning interface 770 also may be provided with a content player to present courses that are downloaded from the learning system 620 to the storage 760.

Dynamic E-Learning Course

As previously described, conventional CBT systems offer fixed courses to a learner. For example, the learner has the option of taking the entire course or not taking course. However, a learner may not want to take the entire course for various reasons. Therefore, the learning system 620 may be used to dynamically create courses tailored to the needs of a learner.

In one implementation, the learning system 620 may dynamically create, assemble, and/or build new temporary courses from the structural elements of an existing course according to the specific needs of a learner. The learner's needs may be expressed using a budget and other criteria provided by the learner. Using the budget and criteria, the learning system 620 may identify existing structural elements that may be used to assemble a dynamic course. After the course is assembled, the course may be temporarily stored and presented to the learner using the learning station 610.

The learner may connect to the learning system 620 to identify a course using the learning interface 770 of the learner station 610. For example, the learner may browse a course catalog to determine or identify a particular topic, subject, course, or content of interest. The learner may use the catalog to navigate to any courses offered by the learning system 620 and to obtain more detailed information about the course. The learner also may use the search features of the learner interface 770 to find a specific course or topic based on keywords, competencies, and/or subjects. The learner also may identify a course by inputting the name of the course (if the name is already known).

The administration management system 627 also may identify a course for a learner based on a skill, a qualification, and/or a competency that a learner wants or needs to acquire. The learning system 620 may use information input by the user and/or information stored in a learner account of the learning administration management system 627 to identify such courses.

Once a course is identified, a budget is determined. The budget may be used to determine how much information is presented to the learner. The budget may be determined from one or more resources the learner wants to spend to take a dynamic course. For example, the budget may include an amount of time or money the learner may spend taking a course. Budgets also may include a combination of available resources (e.g., time and money).

Each structural element of a course may have one or more associated cost elements. The cost element determines how much of a resource of the learner budget is consumed by the structural element. For example, each structural element may have an associated cost in time (e.g., the average time a learner spends on the structural element). Each structural element may have an associated monetary cost. The cost elements may be stored as metadata associated with the structural elements. The cost elements may be subtracted from a learner budget to determine the content that is used to create a dynamic course, as explained in detail below.

The learning system 620 also may determine information about the learner to create a dynamic course. For example, the learner may be prompted to enter courses already completed, and skills, competencies, qualifications, and knowledge already obtained. The learner information also may be obtained from the learner account maintained by the administrative management system 627. The learner information may be used to restrict adding structural elements that the learner has already taken or whose knowledge the learner may already know from previous experience or training.

To create the dynamic course the learning system 620 may determine a structural element or a target element from the identified course (e.g., stored by the content management system 625) based on the input from the learner. For example, the target element may be determined as the result of a skill, a task, a topic, or information desired by the learner. In one implementation, the learning system 620 may determine multiple structural elements based on the learner input. Each of the multiple structural elements may be presented to the learner, and the learner may select one of the structural elements to be used as the target element.

After a target element has been determined, a set of structural elements related to the target element is determined. The related structural elements may be determined using metadata associated with the structural elements, such as structural relations (e.g., prerequisite, determines, belongs to, etc.), which are represented by edges in the course graphs.

Using the determined user information, the learning system 620 may remove any structural elements that the learner has already taken or based on skills, competencies, qualifications, device capabilities, access rights, and knowledge already possessed to determine the set of structural elements related to the target element. For example, if a learner has already taken a structural element in a course, the structural element may be removed from the related set. In addition, device capabilities may be used to restrict or remove structural elements that are not supported by the learning interface (e.g., presenting a course on a Palm V™ excludes the use of video files). Access rights also may be used to remove structural elements (e.g., structural elements that contain confidential material, such as answers to test that are only to be viewed by instructors or tutors).

The learning system 620 may use the target element and related set to iteratively build the dynamic course. The target element is added to a final course set. The budget is reduced by the cost associated with the added target element. The learning system 620 determines the next structural element in the related set that is most closely related to the target element that has not been added to the final course set. To determine the next most closely related element, a proximity/distance between each element and the target element may be determined. In one implementation, the determination is based on the underlying given course graph and the number of relations or "distance" that must be traversed to reach the target element from a given structural element in the related set.

The distance may be modified by weighting each relation according to the relation's type (e.g., a "prerequisite"-relation may be provided with a lower weighting and therefore its associated element is considered to be more closely connected to a target element than an element connected by a "belongs-to"-relation). The most closely related structural element may be determined as the structural element with the smallest distance (e.g., number of relations traversed taking into account any weighting) to the target element. If the distance between two structural elements is the same (even after weighting is applied) the closest structural element may be chosen randomly or based on another factor (e.g., another weighting, such as number of structural elements related to the structural element).

After identifying the next most closely related element, the learning system 620 determines whether to add the complete structural element or a portion of the structural element (e.g., restricted to some subparts). A distance-weighting constant and/or other factors, such as a cost of the structural element (and its subparts), the remaining budget, and the distance of the structural element from the target element may be used to determine whether to add the complete/partial element.

For example, the distance-weighting constant may be used to restrict content of structural elements from being presented to the learner of a dynamic course. The distance-weighting constant may determine whether a learner prefers to be presented with a complete, an incomplete, or a mixture of incomplete/complete structural elements when taking a dynamic course. If complete structural elements are preferred, then a radius or distance from the target element may be set as small (and therefore fewer structural elements are added to the dynamic course). Likewise, if incomplete structural elements are preferred, the radius or distance from the target element may be set as large (and therefore more structural elements may be added to the dynamic course).

The learning system 620 may determine the distance-weighting constant by offering the learner a number of alternatives, such as "Prefer large background" (for a larger radius) and "Prefer details" (for a smaller radius). The alternatives may be mapped to distance-weighting parameters that are defined within the learning system 620. An application of a distance-weighting is described below.

For example, a structural element, such as learning unit 500 as shown in FIG. 5, may include a number of knowledge items (e.g., 510, 520, 525, 526, and 527). The knowledge items may be associated one or more knowledge types (e.g., as shown in FIG. 5, knowledge of example, knowledge of orientation, knowledge of reference, and knowledge of action). Each knowledge item of the learning unit 500 also may have an associated cost (e.g., time or money), which may expend a learner resource. For example, each knowledge item 510, 520, 525, 526, and 527 may have an associated cost of five minutes. Therefore, the total cost (in minutes) associated with the entire learning unit 500 is thirty minutes. If a learner has a budget of thirty minutes, the entire budget is spent taking the learning unit 500. However, a distance-weighting constant may be applied to the learning unit 500 to restrict the number of knowledge items and provide an incomplete or restricted view of the structural element 500. As a result, the radius of structural elements provided in a dynamic course may be increased.

The application of a distance-weighting constant may be implemented as follows. Each knowledge type may be assigned a "distance influence value." For example, overview knowledge may be assigned a value of 0 (which indicates that this type of knowledge should be presented despite any distance weighting); "action knowledge" may be assigned a value of 0.3; "explanation knowledge" may be assigned a value of 0.6; "reference knowledge" may be assigned a value of 0.9. When determining whether a structural element (e.g., a learning unit) may be added, a "inverse relevance value" may be determined for each knowledge item of the learning unit as "distance influence value"*"distance-weighting"*"distance." If the "inverse relevance value" is below a given threshold, the respective knowledge item may be added to the dynamic course (if the budget constraints can be met as well). If any budget remains after determining the structural elements of the dynamic course, the threshold may be increased and the dynamic course elements may be recomputed using the increased threshold (in order to attempt to use all or as much of the budget as possible).

As an example, a distance-weighting constant may be applied to the learning unit 500, so that explanation and reference knowledge is omitted. In this case, only knowledge items of knowledge type overview and action are used to create the dynamic course. Applying the distance-weighting constant to the learning unit 500 results in only ten minutes of the budget being consumed (allowing the budget to be used to add additional learning objects to the dynamic course).

As long as there is a remaining budget and there are structural elements in the related set, the learning system 620 may continue to add structural elements to the final course set in the manner described above.

Once the final course set is determined, the learning system 620 assembles the structural elements identified by the final course set as a dynamic course that may be presented to the learner. The course may be temporarily stored in the content repository or other storage area (e.g. storage 760) and accessed by a content player to be presented at the learner station 610 (or downloaded as an offline course).

Figure 8:
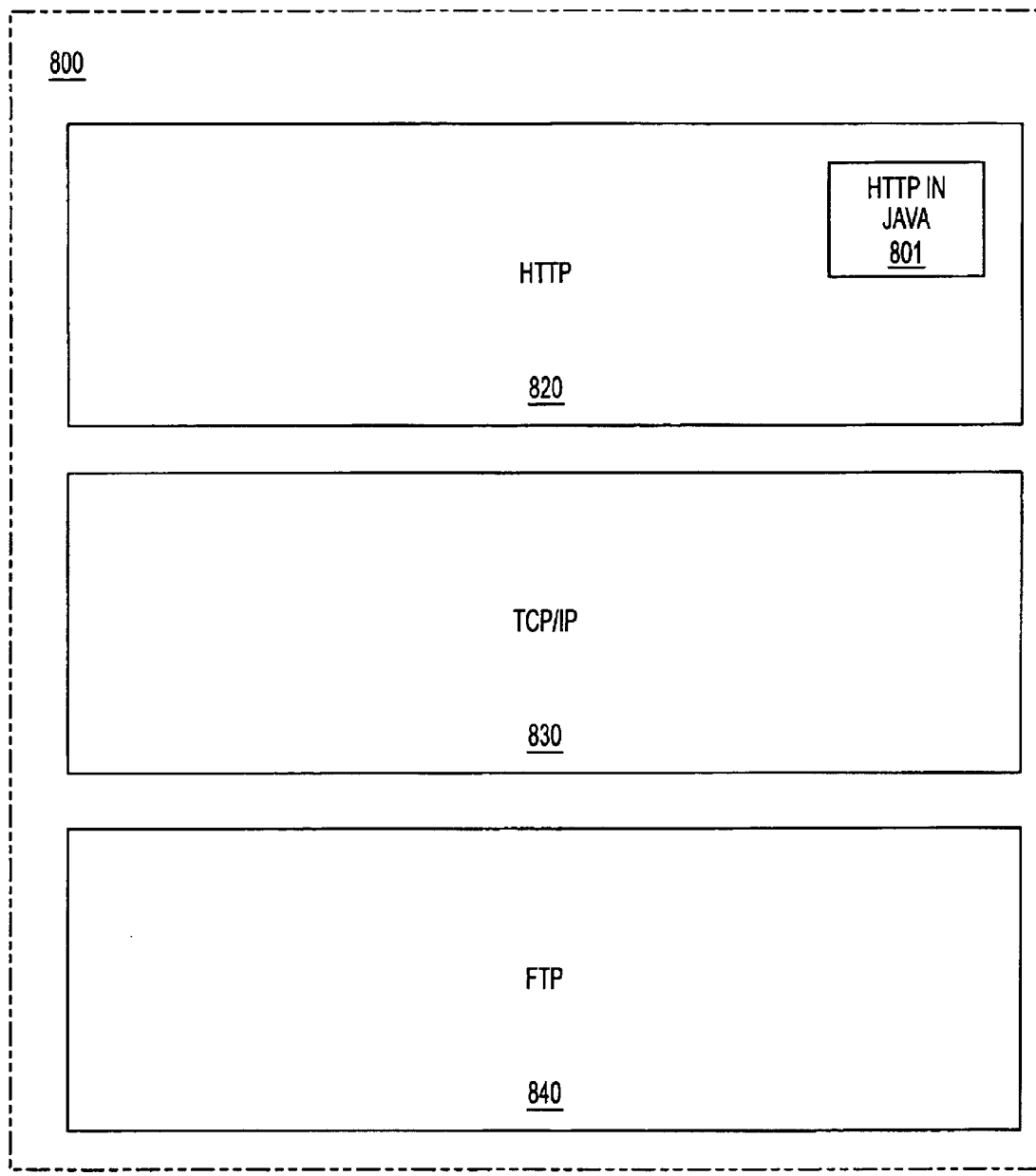
FIG. 8 is an exemplary course graph.

FIGS. 8, 9, 10, and 11 show an example of the creation of a dynamic course. For example, a learner may want to learn how to run http-connections in JAVA®. Using a search feature of the learner interface 770, the learner enters information describing the particular area of interest (i.e., how to run http-connections in JAVA®). As shown in FIG. 8, the learning system 620 determines a course 800 on communication protocols that includes a structural element 801 (Http in JAVA®). The course 800 also includes a sub course 820 on http, a sub course 830 on TCP/IP, and a sub course 840 on the file transfer protocol. The learner selects course 800 and provides a budget of 40 minutes (e.g., the amount of time the learner has before a client meeting for which he needs the information).

Based on the learner input, the learning system 620 determines structural element 801 as the target element. The learning system 620 also determines a distance-weighting constant (preferring a large background/radius) and information about the learner. Accessing the learning account of the learner from the administration management system 627, the learning system 620 determines that the learner has general competencies in computer networks.

Figure 9:
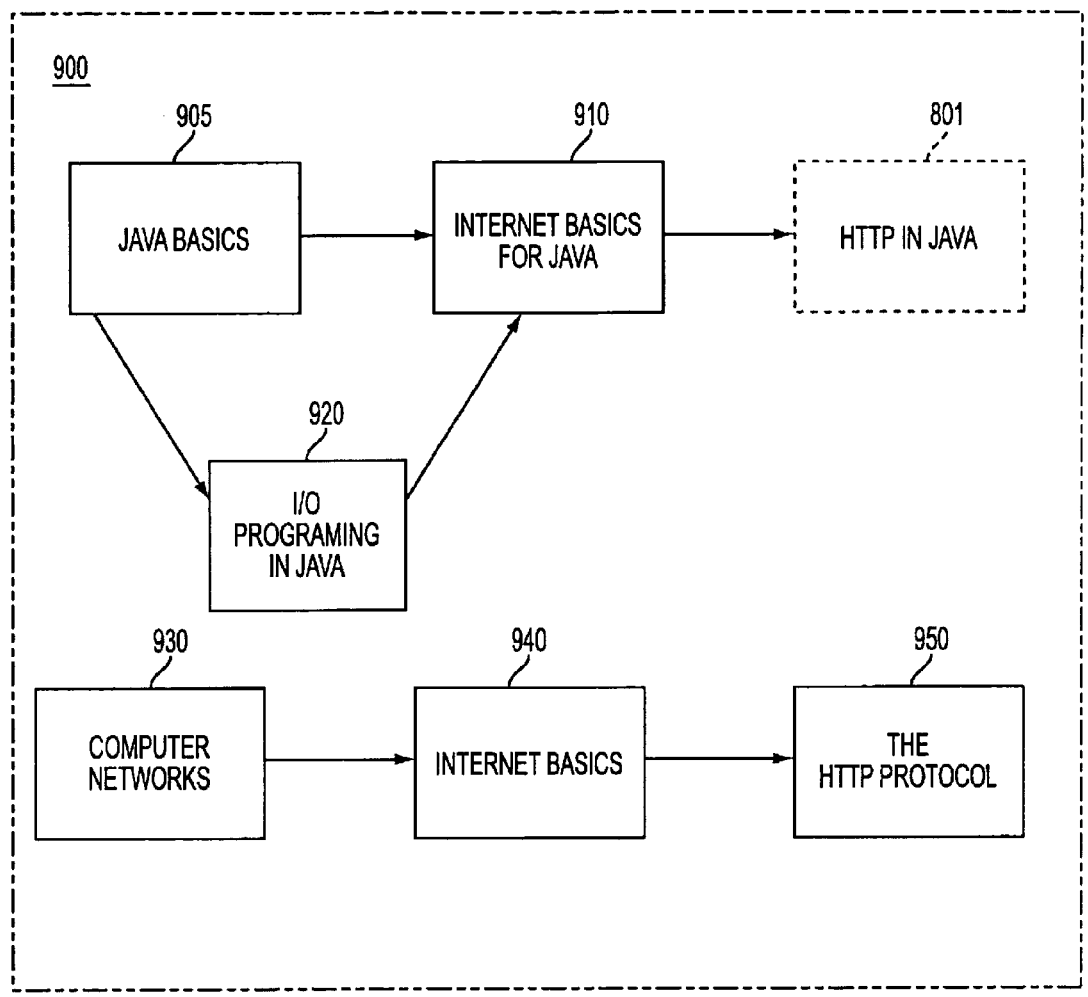
FIG. 9 is an exemplary related set graph.

As shown in FIG. 9, the learning system 620 may determine a set 900 of structural elements from sub course 820 that are related to the target element 801. The related set 900 includes the learning units JAVA® BASICS 905 (e.g., having a cost of 20 minutes), Internet basics for JAVA® 910 (e.g., having a cost of 15 minutes), I/O programming in JAVA® 20 (e.g., having a cost of 20 minutes), Computer networks 930 (e.g., having a cost of 25 minutes), internet basics 940 (e.g., having a cost of 25 minutes), and the HTTP protocol 950 (e.g., having a cost of 15 minutes).

The learning units may have a number of relations. For example, learning units 910 and 950 are prerequisites for the target element 801. Learning units 905, 920, and 940 are prerequisites for learning unit 910. Learning unit 905 is a prerequisite for learning unit 920. Learning unit 930 is a prerequisite for learning unit 940. The learning system 620 removes the learning unit 930 computer networks and 920 based on the learner's previous knowledge.

Figure 10:
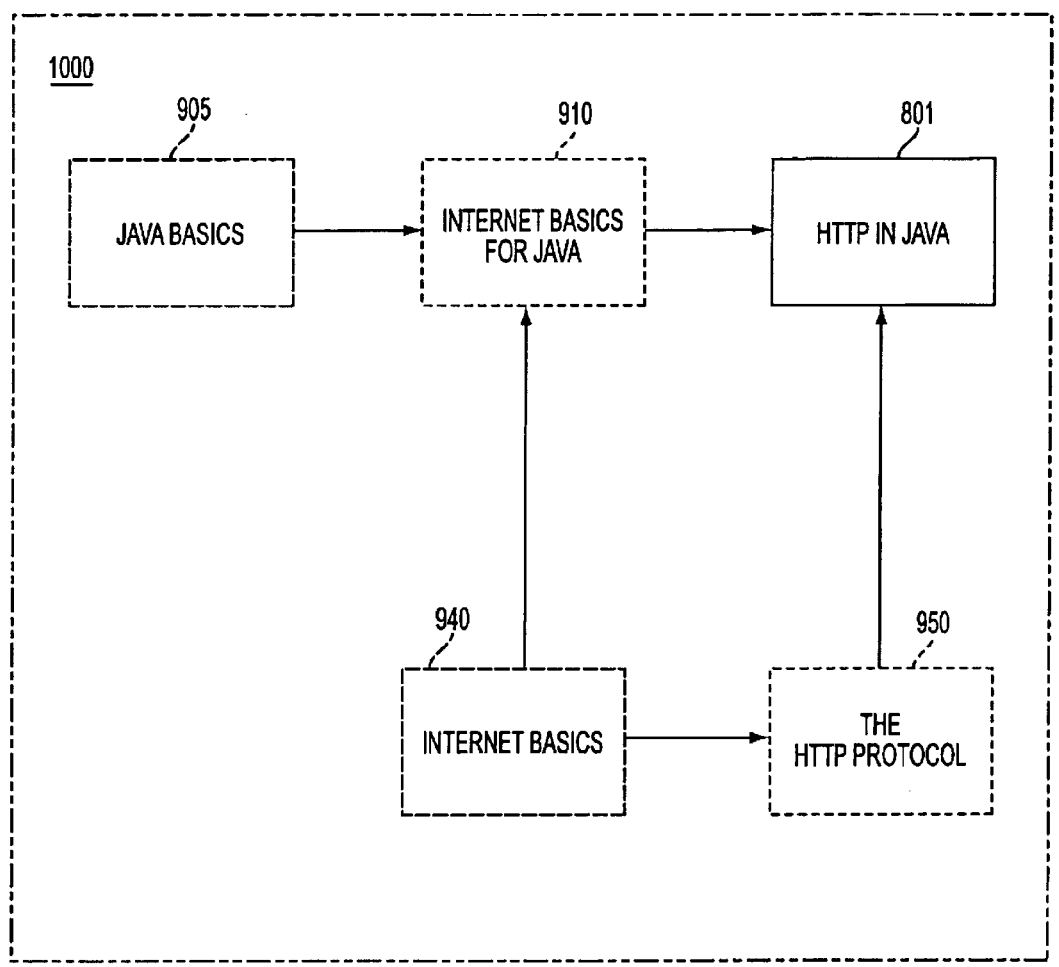
FIGS. 10 and 11 are exemplary dynamic course graphs.

FIG. 10 shows a dynamic course set 1000 that may be created. The target element 801 is added to the course set and the budget is reduced by five minutes (with 35 minutes remaining). With budget and structural elements remaining, the next closest element (with a distance of 1) is determined to be Http protocol 950 with a cost of 15 minutes. The distance-weighting constant (pertaining to overview and action knowledge) is applied reducing the cost to 10 minutes. The partial structural element (as indicated by the dotted lines) is added (having only action knowledge items and overview knowledge items) and the budget is reduced by 10 minutes (with 25 remaining).

With budget and structural elements remaining, the next closest structural element (with a distance of 1) is determined to be Internet basics for JAVA® 910 (with a cost of 15 minutes). The distance-weighting constant is applied reducing the cost to 10 minutes (with only overview knowledge items remaining). The partial structural element (noted by dotted lines) is added and the budget is reduced (with 15 minutes remaining).

With budget and structural elements remaining, the next closest structural item (with a distance of 2) is determined to be Internet basics 940 having a cost of 25 minutes. The distance weighting constant is applied reducing the cost to 10 minutes (removing all knowledge items except those with overview knowledge). The partial structural element (as shown by the dashed lines) is added to the dynamic course set 1000 and the budget is reduced (with 5 minutes remaining).

With budget and structural elements remaining, the next closest structural element (with a distance of 2) is determined to be JAVA® BASICS 905 with a cost of 20 minutes. The distance-weighting constant is applied to reduce the cost to 5 minutes (again only overview knowledge is added because of distance from the target element) and the partial structural element is added (with zero minutes remaining). The budget is expended and the process stops. The dynamic course set 1000 is then used to create a temporary course, which is presented to the learner.

Figure 11:
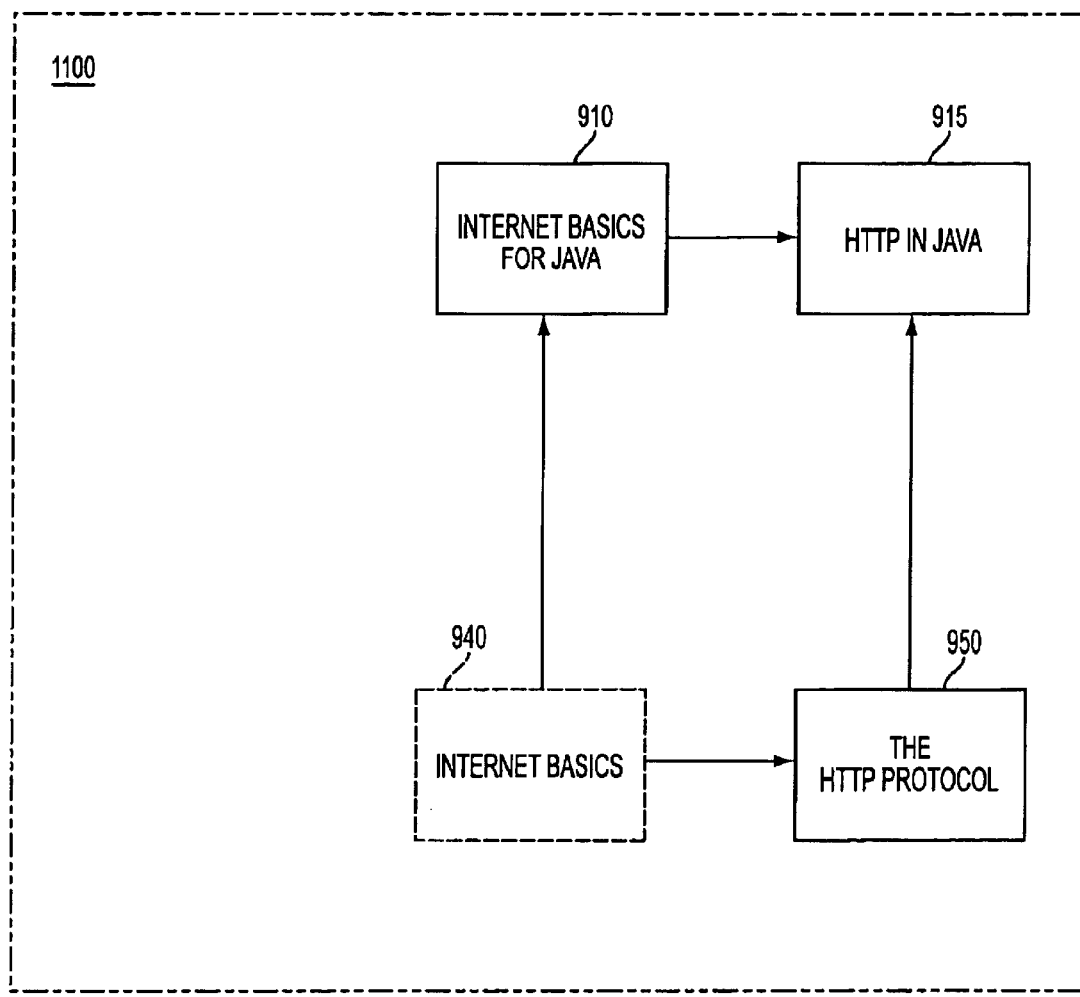

FIG. 11 shows a dynamic course set 1100 that is obtained without using the distance-weighting constant. The target element 801 is added to the course set and the budget is reduced by five minutes (with 35 minutes remaining). With budget and structural elements remaining, the next closest element is determined to be Http protocol 950 with a cost of 15 minutes. The entire structural element is added and the budget is reduced by 15 minutes (with 20 remaining).

With budget and structural elements remaining, the next closest structural element is determined to be Internet basics for JAVA® 910 (with a cost of 15 minutes). The entire structural element is added to the dynamic course set 1000 and the budget is reduced (with 5 minutes remaining).

With budget and structural elements remaining, the next closest structural elements are determined to be Internet Basics 940 (with a cost of 20 minutes). The entire structural element 940 may not be added so an overview knowledge item is determined to reduce the cost to 5 minutes and the partial structural element is added (with zero minutes remaining). The budget is expended and the process stops. Unlike the course set 1000, the structural element JAVA® BASICS 905 (with a cost of 25 minutes) cannot be added to the dynamic course set because the budget is spent. The dynamic course set 1100 is then used to create a temporary course, which is presented to the learner.

Figure 12:
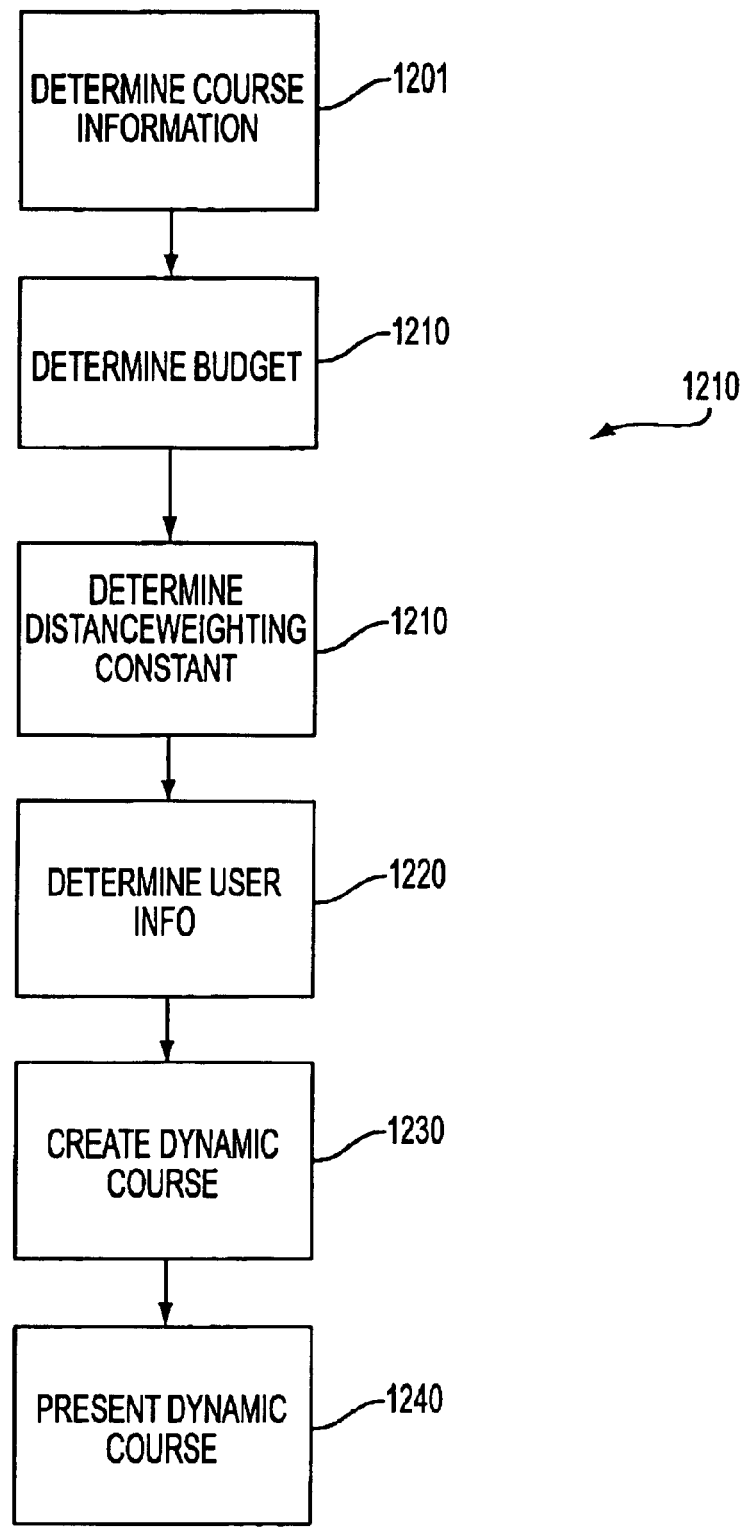
FIG. 12 is an exemplary process for presenting a dynamic course.

FIG. 12 shows a process 1200 for presenting a dynamic course. According to the process 1200, the learner provides information about the course or topic of interest 1201. The learner also provides a budget 1210. A distance-weighting constant may be determined (or provided by the learner based on the learner input). Learning account information about the learner may be determined 1220. The dynamic course is created based on the provided course information, the budget, the weighting constant, and the learner information 1230. The dynamic course is assembled and presented to the learner 1240.

Figure 13:
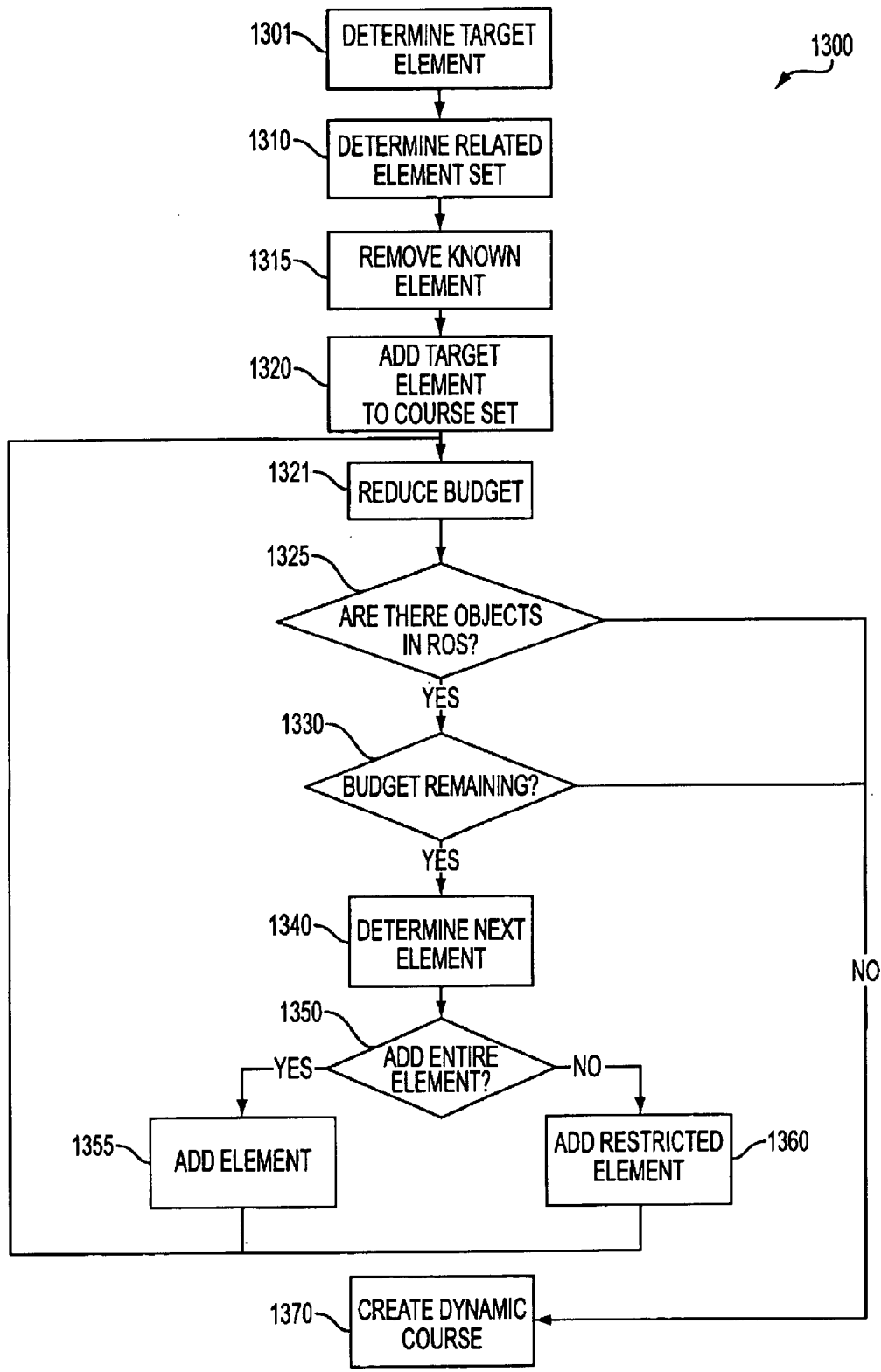
FIG. 13 is an exemplary process for building a dynamic course.

FIG. 13 shows a process 1300 for building the dynamic course (e.g., corresponding to block 1230 in FIG. 12). A target element is determined for the course or topic information provided by the learner 1301. A related set of structural elements is determined for the target element (1310). Structural elements that are already known by the learner, denied because of access rights, or incompatible because of device type may be removed from the related set 1315.

The target element is added to the dynamic course set 1320. The budget is reduced by an amount corresponding to a cost associated with the added structural element (i.e., the target element) 1321. It is determined if any structural elements are left in the related set 1325.

If no structural elements are left, the course is built from the structural elements in the course set 1370. If there are structural elements remaining, it is determined if any budget remains 1330. If no budget remains, the dynamic course is built from the structural elements in the course set 1370. If a budget remains, the next, closest structural element to the target element is determined 1340. It is then determined whether to add the entire structural element 1350 (e.g., based on the distance-weighting constant or other factors, such as cost and remaining budget). If so, the entire structural element is added to the course set 1355. If not, a restricted structural element is added 1360. The steps 1321, 1325, 1330, 1340, 1350, and 1360 are repeated until no budget or structural elements are left in the related set.

The processes of FIGS. 12 and 13 may be performed by a processor running a dynamic course builder application. In one implementation, the process may be implemented as a separate module of the learning management system 625 or as part of the content player. However, the dynamic course builder may be connected to the learner station 610 and to the content player (which presents the dynamic course to the learner via the learning station 610). The dynamic course also may be downloaded to the learning station as an offline course (based on the created dynamic course).

A number of implementations have been described. Nevertheless, it will be understood that various modifications may be made. For example, advantageous results may be achieved if the steps of the disclosed techniques are performed in a different order and/or if components in a disclosed system, architecture, device, or circuit are combined in a different manner and/or replaced or supplemented by other components. Accordingly, other implementations are within the scope of the following claims.

What is claimed is:

1. A method, performed by one or more processing devices, for creating a dynamic course, the method comprising:

determining, via a processing device, a budget of a learner;

determining, via a processing device, a target element;

determining, via a processing device, a set of related elements that relate to the target element;

determining, via a processing device, a distance of one or more related elements from the target element;

combining, via a processing device, the target element and the one or more of the related elements based, at least in part, on the distance, to create the dynamic course based on the budget; and decreasing, via the processing device, a budget by a cost of each element used to create the dynamic course.

2. The method of claim 1 wherein determining a target element includes determining a cost of the target element and determining the set of related elements includes determining a cost of each element of the set of related elements.

3. The method of claim 2 wherein combining the target element and the one or more related elements includes creating a course set; and creating the dynamic course from the course set when the budget is depleted.

4. The method of claim 2 wherein determining a cost of the target element and determining the set of related elements includes determining a cost in time of each element.

5. The method of claim 2 wherein determining a cost of the target element and determining the set of related elements includes determining a cost in monetary units of each element.

6. The method of claim 1 further comprising determining, via a processing device, a distance weighting constant, wherein combining is based on the distance weighting constant.

7. The method of claim 6 wherein combining includes adding one or more restricted elements based on the distance weighting constant.

8. The method of claim 1 wherein determining the set of related elements includes removing elements based on one or more restriction factors.

9. The method of claim 8 wherein removing elements based on one or more restriction factors includes removing elements based on knowledge of the learner.

10. The method of claim 8 wherein removing elements based on one or more restriction factors includes removing elements based on access rights.

11. The method of claim 8 wherein removing elements based on one or more restriction factors includes removing elements based on device types.

12. The method of claim 8 wherein removing elements based on one or more restriction factors includes removing elements based on a competency of the learner.

13. The method of claim 1 further comprising presenting, via a processing device, the dynamic course to the learner.

14. A system for creating a dynamic course comprising: an interface to access a course and associated course elements; and
  a processor configured to: determine a budget of a learner, determine a target element of the course from the course elements, to determine a distance of one or more related elements from the target element; combine the target element and one or more of the related elements based, at least in part, on the distance, to create the dynamic course based on the budget, and decrease the budget by a cost of each element used to create the dynamic course.

15. The system of claim 14 wherein the processor is configured to determine a cost of the target element and a cost of each element of the set of related elements.

16. The system of claim 15 wherein the processor is configured to create a course set, and to create the dynamic course from the course set when the budget is depleted.

17. The system of claim 15 wherein the cost comprises a time associated with each element.

18. The system of claim 15 cost comprises monetary units associated with each element.

19. The system of claim 14 wherein the processor is configured to determine a distance weighting constant, wherein combining is based on the distance weighting constant.

20. The system of claim 19 wherein combining includes adding one or more restricted elements based on the distance weighting constant.

21. The system of claim 14 wherein determining the set of related elements includes removing elements based on one or more restriction factors.

22. The system of claim 21 wherein removing elements based on one or more restriction factors includes removing elements based on knowledge of the learner.

23. The system of claim 21 wherein the one or more restriction factors include access rights.

24. The system of claim 21 wherein the one or more restriction factors include device types.

25. The system of claim 21 wherein the one or more restriction factors include a competency of the learner.

26. The system of claim 14 further comprising an interface to present the dynamic course to the learner.

27. A machine-readable medium including instructions for causing a processor to:
  determine a budget of a learner;
  determine a target element;
  determine a set of related elements that relate to the target element;
  determine a distance of one or more related elements from the target element;
  combine the target element and one or more of the related elements based, at least in part, on the distance, to create a dynamic course based on the budget; and
  decrease the budget by a cost of each element used to create the dynamic course.

28. The machine-readable medium of claim 27 further comprising instructions to cause the processor to determine a cost of the target element and to determine a cost of each element of the set of related elements.

29. The machine-readable medium of claim 28 further comprising instructions to cause the processor to create a course set; and to create the dynamic course from the course set when the budget is depleted.

30. The machine-readable medium of claim 28 further comprising instructions to cause the processor to determine a cost in time of each element.

31. The machine-readable medium of claim 28 further comprising instructions to cause the processor to determine a cost in monetary units of each element.

32. The machine-readable medium of claim 27 further comprising instructions to cause the processor to determine a distance weighting constant, wherein combining is performed based on the distance weighting constant.

33. The machine-readable medium of claim 32 further comprising instructions to cause the processor to add one or more restricted elements based on the distance weighting constant.

34. The machine-readable medium of claim 27 further comprising instructions to cause the processor to remove elements based on one or more restriction factors.

35. The machine-readable medium of claim 34 further comprising instructions to cause the processor to remove elements based on knowledge of the learner.

36. The machine-readable medium of claim 34 further comprising instructions to cause the processor to remove elements based on access rights.

37. The machine-readable medium of claim 34 further comprising instructions to cause the processor to remove elements based on device types.

38. The machine-readable medium of claim 34 further comprising instructions to cause the processor to remove elements based on a competency of the learner.

39. The machine-readable medium of claim 27 further comprising instructions to cause the processor to present the dynamic course to the learner.

* * * * *